(12) United States Patent
Hartwig

(10) Patent No.: US 6,551,519 B1
(45) Date of Patent: *Apr. 22, 2003

(54) OZONATION OF POOL WATER

(75) Inventor: Wolfram Hartwig, Ottawa, IL (US)

(73) Assignee: Neuman Pools, Inc., Beaver Dam, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/929,638

(22) Filed: Aug. 14, 2001

Related U.S. Application Data

(63) Continuation-in-part of application No. 09/336,901, filed on Jun. 21, 1999, now Pat. No. 6,274,052.

(51) Int. Cl.$^7$ .................................................. C02F 1/78
(52) U.S. Cl. ........................ 210/760; 210/764; 210/765
(58) Field of Search .................................. 210/760, 764, 210/765, 805

(56) References Cited

U.S. PATENT DOCUMENTS

| | | | |
|---|---|---|---|
| 4,043,913 A | 8/1977 | Hintermeister |
| 4,865,749 A | 9/1989 | Yoshida |
| 5,032,292 A | 7/1991 | Conrad |
| 5,665,228 A | 9/1997 | Leaverton et al. |
| 5,685,994 A | 11/1997 | Johnson |

*Primary Examiner*—Betsey Morrison Hoey
(74) *Attorney, Agent, or Firm*—Reinhart Boerner Van Deuren, s.c.

(57) ABSTRACT

A method for the treatment of pool water with ozone at concentrations less than previously employed. Ozonation, as described herein, provides several distinct advantages including but not limited to inactivation of Cryptosporidium and other water borne microorganisms, reduction of combined chlorine concentrations and oxidation of chloramines.

5 Claims, 5 Drawing Sheets

OZONATION OF POOL WATER

This application is a continuation-in-part of application Ser. No. 09/336,901 filed Jun. 21, 1999, issued as U.S. Pat. No. 6,274,052 on Aug. 14, 2001 and claims priority benefit therefrom.

FIELD OF THE INVENTION

This invention relates generally to the ozonation of various pool systems and, more particularly, to such treatment for the inactivation of cryptosporidium and reduction of chlorine concentrations. The treatment processes described herein provide unexpected and surprising results when compared to treatment systems of the prior art.

Swimming pool water differs significantly from drinking water, although almost universally potable water is used to fill pools, initially. Most state health codes for pools mandate a pH between 7.2 and 7.8. In addition, many of those codes also stipulate a minimum, and sometimes a maximum, level for a sanitizer, and recommend values for calcium hardness and bicarbonate alkalinity. The only sanitizers currently permitted are hypochlorous acid, HOCl (customarily referred to as chlorine in the pool industry), and less often hypobromous acid, HOBr (likewise, referred to as bromine). Any future use of "chlorine" or "bromine" herein refers to these acids, and not to the elemental forms of chlorine gas ($Cl_2$) or liquid bromine ($Br_2$).

With the exception of dichloro-isocyanuric acid, all compounds that produce chlorine or bromine in pool water influence the pH. It is therefore necessary to add either an acidic or caustic substance to maintain the pH. This means that pools have two injection systems: one for the selected sanitizer, and another one for the pH control.

The hypochlorous acid, often referred to as "free chlorine," can combine with ammonium ions in the water to form monochloramine ($NH_2Cl$), and to a much lesser degree dichloramine ($NHCl_2$). These chloramines are the main source of irritation for pool patrons, because they have a strong chlorine-like odor, and cause the typical "swimmer's red eye" and itching. While a pool with a concentration of several mg/L chlorine is essentially odor-free, chloramine levels as low as 0.1–0.2 mg/L are noticeable.

Although chloramines are assumed to be the major contaminant fraction, it is known that other chlorinated amines may be present, such other chloramines including the chlorinated byproducts of creatine and creatinine (together, "total chlorine"). Chemical tests are available to measure the concentrations of free chlorine (HOCl), and "total chlorine." The difference between these two measurements is called "combined chlorine," and is assumed to consist mostly of monochloramine. Although the various chlorinated nitrogen compounds have quite different properties, they are lumped together by the pool industry under the "combined chlorine" label, mostly because the pool-side test kits cannot distinguish between the various chlorination byproducts. Most of the odor, and the eye and skin irritation at indoor pools is, however, directly related to the presence of mono- and di-chloramines.

Many state codes require -operators to initiate procedures such as breakpoint chlorination or the addition of high doses of non-chlorine oxidants, once the combined chlorine level reaches 0.5 mg/L. Breakpoint chlorination is a very slow process, and is usually done after hours or overnight. This means that the operator must start the process after the pool closes, and dechlorinate down to normal levels before the pool re-opens. Pool operators and owners have been looking for ways to reduce or eliminate this costly and labor-intensive procedure.

It should be noted that the chloramine problem is essentially limited to indoor pools. The natural air convection at outdoor pools, coupled with the volatility of the chloramines, ensures that outdoor pools rarely encounter problems with high levels of combined chlorine. Moreover, the tendency towards energy conservation has lead to drastically lowering the amount of fresh air drawn into indoor pool enclosures, and warm air rejected from there to the atmosphere. Elaborate humidity control and heat recovery systems ensure energy savings, but inhibit the venting of the odorous chloramines.

The requirement for maintaining chlorine levels at or above the specified minima is meant to ensure that the pool water remains free of harmful microorganisms. Bacteria, such as *E. coli* or *Pseudomonas aeruginosa*, that may be found in pool or hot whirlpool environments are easily inactivated when the required sanitizer level is continuously maintained. Exceptions are Giardia and Cryptosporidium, which are difficult to inactivate in a pool environment. Since the 1993 Crypto outbreak (drinking water) in Milwaukee, Wis., there have been a number of similar instances relating to swimming pools in Wisconsin, elsewhere, as well as waterparks in Georgia and California. Chlorine has an estimated CT-value of 9600 mg-min/L (where C is average concentration and T is average time) at typical pool water temperatures. With such high concentrations and/or time, it is clear that chlorine is completely ineffective in providing inactivation within a reasonable time span, and at levels tolerable to the bathers.

Ozone has a long history in the treatment of drinking water. However, its use in pool water treatment is much more recent, becoming common in Europe only during the 1960's. The first large US pool ozone system is probably the German DIN-based system at the Peck Aquatic Facility in Milwaukee, Wis. Since then, the number of installed pool ozonation systems has increased rapidly. Most of these systems are, however, fairly small when compared to those required by European codes, such as the German DIN 19623. The typical US installation ozonates a side stream after the filter, with some units treating only 8%–10% of the total filtration flow, and others recommending 25% side stream ozonation for 4 minutes at 0.4 mg/L.

SUMMARY OF THE INVENTION

There are a considerable number of problems and deficiencies associated with pool water treatment systems of the prior art. There is a demonstrated need for an efficient, economical system by which pathologic microorganisms are reliably inactivated and noxious chlorine concentrations safely reduced.

Accordingly, it is an object of the present invention to provide a system and/or method for the ozonation of pool water volumes, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all instances, to every aspect of the present invention. As such, the following objects can be viewed in the alternative with respect to any one aspect of the present invention.

It is an object of the present invention to provide a pool treatment system whereby reduced levels of ozone can be used effectively to achieve various sanitation and/or oxidation effects.

It can be another object of the present invention to provide a method of ozone treatment of various pool water systems, so as to minimize problems associated with removal of excess ozone.

It can be another object of the present invention to provide an ozonation method and system configuration for use therewith to maximize filtration efficiency.

It can also be an object of the present invention to provide one or more methods for ozone treatment whereby higher average ozone concentrations are maintained over the course of treatment, to enhance effect and increase cost efficiency.

Other objects, features, benefits and advantages of the present invention will be apparent in this summary and descriptions of preferred embodiments, and will be readily apparent to those skilled in the art having knowledge of various water treatment systems. Such objects, features, benefits and advantages will be apparent from the above as taken in conjunction with the accompanying examples, tables, data and all reasonable inferences to be drawn therefrom.

In part, the present invention is a method of using ozone to meet CT values for the inactivation of the cryptosporidium microorganism/bacteria. The method includes (1) providing a pool filtration system, a total filtration flow volume with the system including a contact vessel and a filter downstream; (2) introducing ozone to the filtration flow volume prior to contact with the vessel, such that the ozone is introduced at an average concentration C, where C can preferably be but is not limited to an average concentration of about 0.5 mg/L to about 1.2 mg/L of water volume; and (3) contacting the filtration flow/water volume with said ozone for a time T sufficient and/or to provide a CT-value sufficient to inactivate the microorganism/bacteria. The contact vessel has a length and volume commensurate with the total filtration flow volume. The volume and length of such a vessel is predetermined to provide sufficient contact time with the ozone concentration. In preferred embodiments, the contact time is directly related to the flow rate of the water volume through the contact vessel. In preferred embodiments, the flow rate is less than about one inch of contact vessel length per second.

In part, the present invention also includes a method of reducing combined chlorine concentrations, in pool water, below threshold levels. The inventive method precludes the need for breakpoint chlorination, but includes (1) providing a pool filtration system with a total filtration flow volume, the system including a contact vessel and a filter downstream; (2) diverting about 1% to about 99% of the filtration volume; (3) introducing ozone to the diverted, partial filtration flow volume during pool operation and prior to contact with the vessel, with an ozone concentration of about 0.5 mg/mL to about 1.2 mg/mL of reduced water volume; (4) contacting the reduced water volume for a time sufficient with the ozone concentration; and (5) recombining the contacted, reduced water volume with the filtration flow volume.

With preferred embodiments, the partial volume of water diverted from the filtration flow is about 30% to about 50% of the total filtration flow volume. Regardless, the partial flow volume has a contact time with the vessel of about two minutes to about four minutes. In highly preferred embodiments, the contact vessel has a length and volume such that the flow rate of the reduced water volume through the contact vessel is less than about one inch of vessel length per second.

Even so, further ozone contact can be provided within the downstream filter after a recombination of water volumes. As a result, the combined chlorine concentration is less than about 0.5 mg/L.

In part, the present invention is also a method of oxidizing chloramines in pool water. The method includes (1) providing a pool filtration system with a total filtration flow volume, the system including a contact vessel and a filter downstream; (2) diverting part of the water volume from the filtration flow; (3) introducing ozone to the partial flow volume prior to the contact vessel, the water volume reduced to between about 1% and about 99% of the total filtration volume, and the ozone introduced at a concentration up to about the saturation point of ozone in the reduced water volume; (4) contacting the reduced water volume with the ozone; and (5) recombining the contacted, reduced water volume with the filtration flow volume. As described more fully above, in preferred embodiments, the partial flow volume is about 30% to about 50% of the total filtration flow. Contact with ozone can also occur within the downstream filter. A benefit of the present invention is, if required, introduction of ozone and subsequent oxidation during pool operation.

In part, as evident from the foregoing and various figures provided herewith, the present invention can also include in a pool filtration system having 1) a filter and associated filter flow; 2) a partial filter flow diverted from the filter flow; and 3) an ozonation system incorporated with the partial filter flow, such that the filter is downstream from the ozonation system. The partial filter flow can be between about 1% and about 99% of the filter flow, but is preferably between about 30% to about 50% thereof. Regardless, various preferred embodiments include a partial filter flow diverted from the filter flow upstream from the filter. Various other preferred embodiments include a partial filter flow diverted from the filter flow downstream from the filter. Optionally, the filtration system of this invention can further include a contact vessel included as a component of the ozonation system. Within or without the context of the preceding, a preferred contact vessel has a length and volume sufficient to provide a partial filter flow contact time of about 2 minutes to about 4 minutes.

Ozone is the strongest oxidant available for water treatment, and is also an excellent disinfectant. It has not experienced widespread use even though it would appear well-suited for chloramine destruction and inactivation of Crypto. Preliminary laboratory investigations show the destruction of monochloramine by ozone to be a very slow reaction. Tests at a number of pools suggest high dosages of applied ozone and contact times of 2 minutes or more are required to compensate for the slow destruction and eventually lower chloramine levels and keep them within acceptable levels.

Research since the forementioned Crypto episode indicates that ozonation appears to be the only feasible process for inactivation of the pathogen. However, this research was limited to temperatures encountered in drinking water treatment, from 0.5° C. to a maximum of 25° C. Most pools operate at higher water temperatures −28° C. to 30° C. for pools, and up to 40° C. for hot whirlpools. The CT-value for Crypto at typical pool temperatures is estimated to be in about 3 mg-min/L. However, this estimate is based on initial theoretical ozone concentration values, neglecting the fact that under practical use situations, there are limits to ozone solubility and that such initial concentrations steadily decrease over time.

The inventive methodology described herein provides a route to the reduction and/or destruction of various chlorine species in treated pool water. The same general methodology also provides a heretofore unexplored avenue by which microorganisms can be rendered inactive. As a result, harmful microorganisms not otherwise treatable can be inactivated during the course of normal pool filtration. The examples and descriptions which follow illustrate how variations on the inventive methodology can be used to both sanitize pool water and reduce the problems associated with chlorination.

DESCRIPTION OF PREFERRED EMBODIMENTS

Figure 1:
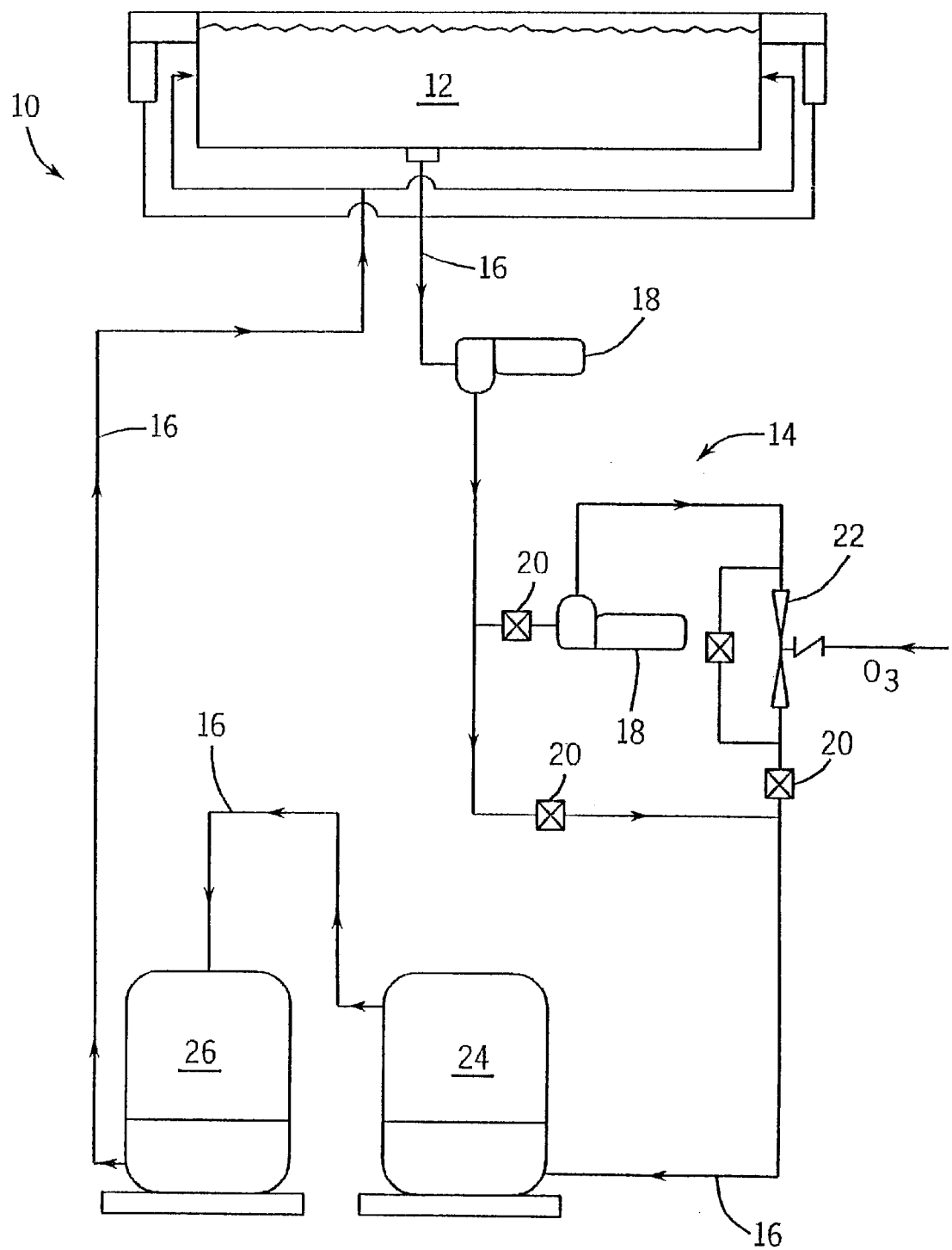
FIG. 1 schematically illustrates a pool filtration system incorporating treatment components and methods in accordance with the present invention.

The accompanying figures provide representative examples of the present invention and illustrate, generally, various embodiments of the methods described herein. One such embodiment provides for 100% ozonation of a filtration flow volume. With reference to FIG. 1, filtration system 10 is arranged and configured to operate in conjunction with pool 12. Swimming pools, whirlpools, lap pools and the like are water systems of the type that can be used in conjunction with the present methodologies. Ozonation system 14 can be incorporated into filtration system 10 to operate in cooperation with filtration flow 16. Various circulation and/or booster pumps 18 can be placed within system 10 and along flow 16 to increase flow rates, maintain pressures and otherwise enhance the results described herein.

Ozonation system 14 can be modified by inclusion of various valves 20 to direct flow volume 16. As shown in FIG. 1, the configuration of valves 20 can allow for (1) a by-pass of ozonation system 14 or (2) 100% ozonation of flow volume 16. Accordingly, ozonation system 14 can be an optional add-on accessory to a pre-existing filtration system.

With total volume flow through system 14, ozone can be introduced therein through injector 22, at concentrations such as those described above and in the examples which follow. A degree of ozonation is accomplished during in-line filtration flow; however, the beneficial effects described herein are enhanced with a controlled movement of filter flow 16 through the volume of contact vessel 24. Rate of movement and time of ozone contact can be engineered by a consideration of numerous factors, most importantly of which is the volume and configuration of contact vessel 24. Inclusion of baffles or other such mechanisms can improve mixing, ozone dissolution and over-all effect. While not shown in FIG. 1, vessel 24 can also be equipped with one of several valve mechanisms, well known to those skilled in the art, to vent or release undissolved ozone.

Flow volume 16 exits contact vessel 24 and is introduced to filter 26. As described more fully below, various filter media can be used to remove and/or break down excess ozone prior to reintroduction of flow volume 16 into pool 12. In the context of the present invention, filter 26 provides another effect: removal of microflocculated microorganisms. Introduction of ozone to flow volume 16 serves to kill, degrade or otherwise inactivate various microorganisms. The cellular remains agglomerate to provide a microflocculant which can be removed by filter 26. Enhanced filter efficiency and other such benefits are not available through systems of the prior art which introduce ozone downstream from the filter.

Figure 2:
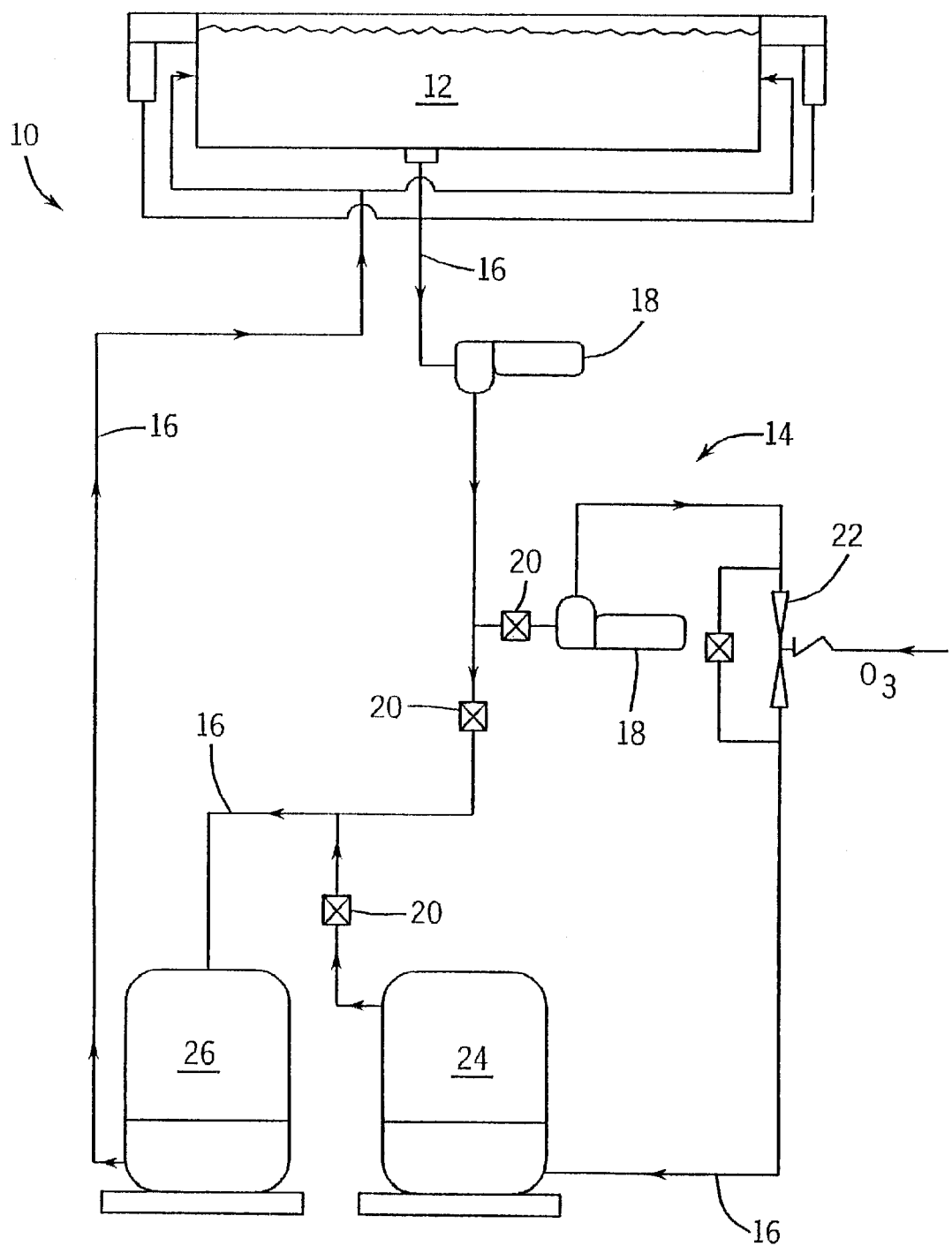
FIG. 2 schematically shows, by diagram, alternative treatment components and methods of the present invention, as can also be incorporated into pool filtration systems, in accordance with the present invention.

FIG. 2 illustrates, schematically, one of several other embodiments of the present invention. In particular, ozonation system 14 is arranged and configured in conjunction with valves 20 for treatment of a side stream off filtration flow 16. Again, as described more fully above with respect to FIG. 1, ozonation system 14 can be optionally included as part of filtration system 10 to provide the beneficial effects otherwise described herein. Ozone contact of a partial volume of filtration flow 16, at concentrations of the type described herein, can oxidize chloramines and/or reduce combined chlorine levels in pool water. As described more fully above, required contact times can be provided by proper, predetermined configuration and volume of contact vessel 24. Upon exit therefrom, the side stream is recombined with filter flow volume 16, directed through filter 26 and reintroduced to pool 12.

Figure 4:
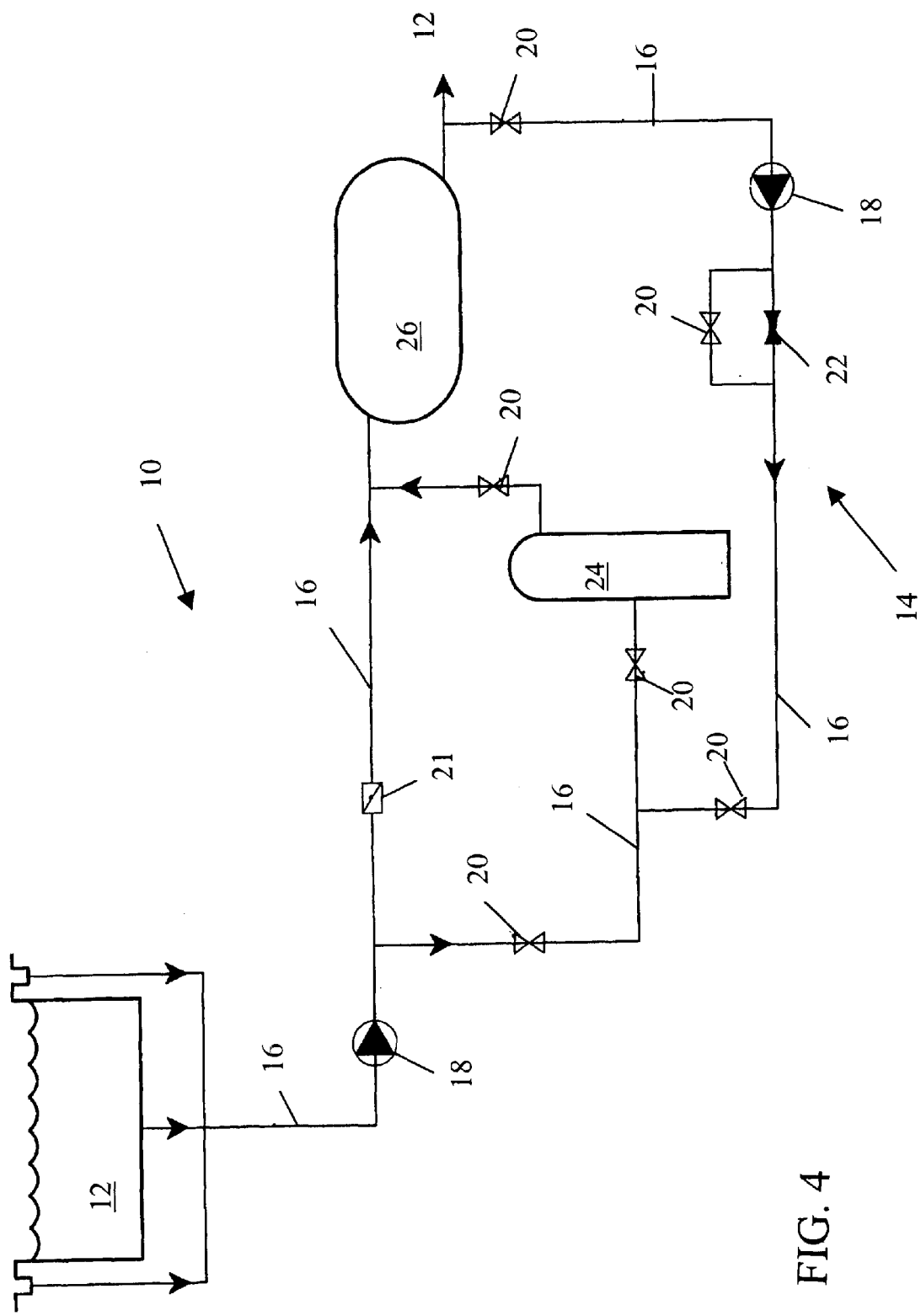
FIGS. 4 and 5 show, respectively, by schematic diagram, alternate treatment systems, components and/or methods in accordance with the present invention.
Figure 5:
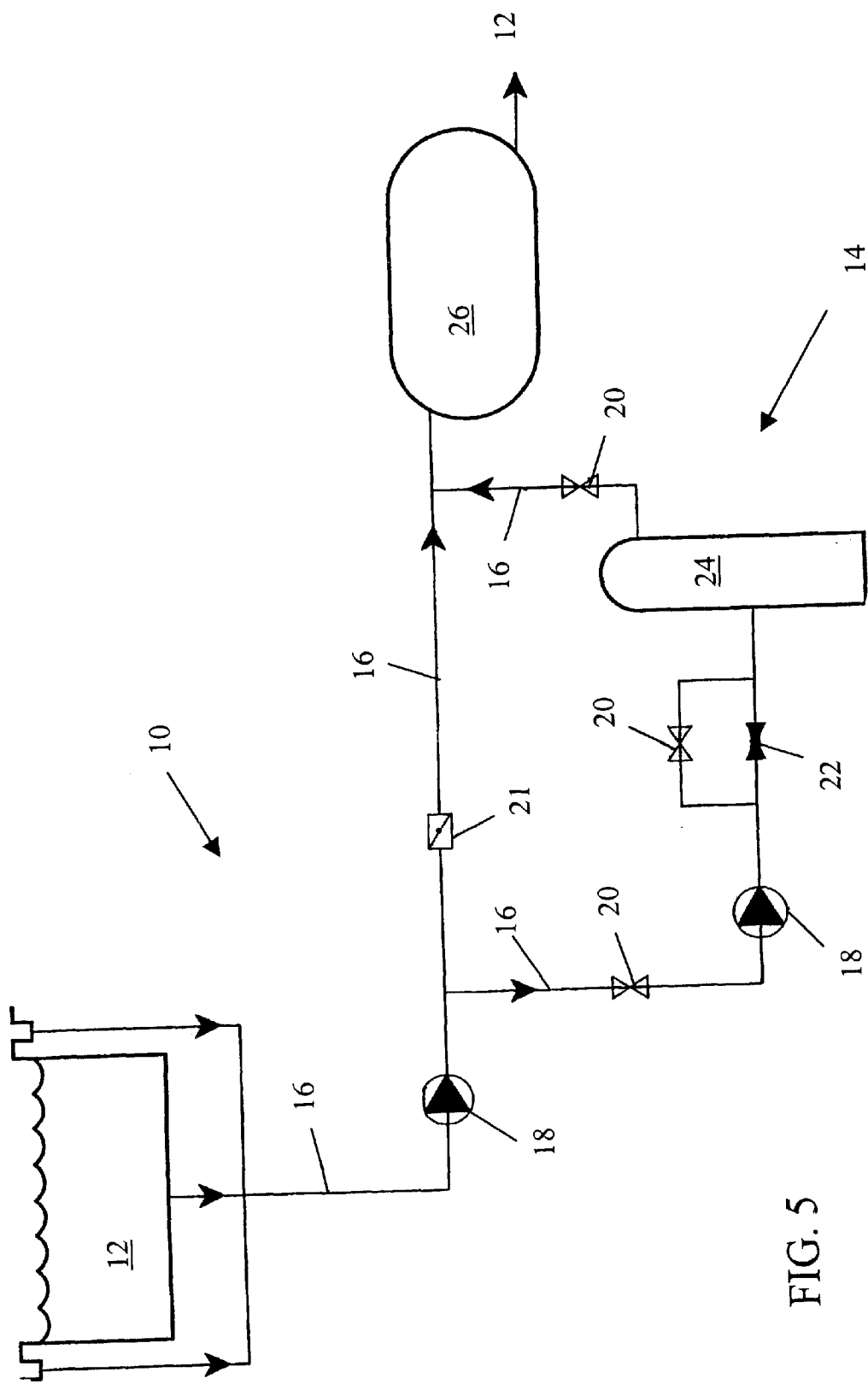

FIGS. 4 and 5 provide schematic illustrations of several other embodiments of the present system as can be used to effect the general methods described herein. Consistent with the preceding description, filtration system 10 is arranged and configured to operate in conjunction with pool 12, and ozonation system 14 can be incorporated therein to operate in cooperation with filtration flow 16. Various circulation and/or booster pumps 18 can be placed within system 10 along flow 16 to increase flow rates, maintain pressures and otherwise enhance the results described herein. Ozonation system 14 can be modified by inclusion of various valves 20 to direct flow volume 16. More particularly, bypass valve 21 can be used to direct and control that part of the filtration flow volume through ozonation system 14. A degree of ozonation and contact time can be achieved during inline filtration flow through system 14; however, the beneficial effects described herein are enhanced with a controlled movement of filter flow 16 through the length and volume of contact vessel 24.

In preferred embodiments, the system of FIG. 4 is configured for operation with bypass valve 21 partially closed. Alternatively, preferred embodiments of the system illustrated in FIG. 5 are configured for operation with bypass valve 21 typically opened. As with other embodiments of this invention, either system can be operated to direct between about 1% and about 99% of filtration flow 16 through ozonation system 14. Choice of an economical, efficient commercially-available ozone injector can allow, depending upon pool and system volume, a smaller booster pump to provide yet additional energy savings.

Various components, equipment and mechanisms which can be used to effect the methods of this invention are commercially-available and would be well-known to those skilled in the art or otherwise involved in the pool sanitation or treatment industry. In particular, such methods, systems and related components are available through Neuman Pools, Inc. and Water Technologies, Inc., both of Beaver Dam, Wis.

EXAMPLES OF THE INVENTION

The following non-limiting examples and data illustrate various aspects and features relating to the methods and/or systems of this invention, including the surprising and unexpected utility of ozone in chlorine treatment and, alternatively, inactivation of microorganisms. Comparable utility and advantages can be realized using various other embodiments, consistent with this invention.

Example 1

A hotel with a large new indoor waterpark, requires a pool water treatment process to inactivate Crypto bacterium and lower chloramine and/or combined chlorine levels. These goals can be achieved in conjunction with and in addition to standard filtration and chemical treatment. See FIGS. 1 and 2. Certain aspects of the following examples have particular application to the present invention or otherwise apply more generally to equipment and/or systems which can be used to effect the inventive methods described herein.

Example 2

The pool water to be treated can be drawn from a surge tank through a strainer into a flooded-suction filtration pump. After pump discharge, the flow can be split. A side stream is boosted in pressure to provide the necessary motive flow and pressure for the ozone injection. Three parallel Mazzei venturi injectors can be used for this purpose. Suction characteristics can be varied via a bypass valve. Ozonated water can be recombined with the rest of the circulation flow and together introduced to one or more contact vessels in parallel. These vessels are ozone-resistant fiberglass and can be equipped with internal baffles to enhance the mixing of the air/ozone bubbles with the water. The flow is upward, at rates described elsewhere herein, to prolong the time available for dissolution of the ozone. Each vessel has a stainless steel offgassing valve mounted near the top, where the undissolved air/ozone mixture is collected and can then be fed through a granular activated carbon-containing (GAC) ozone destruct vessel.

Example 3

In this example of the invention, the combined volume of several parallel contact vessels is 7100 gallons or 26.9 m$^3$. At an average flow of 780 gpm (177 m$^3$/h), the calculated vessel contact time is 9.1 minutes. Actual contact time will be only somewhat shorter, but still far longer than the contact time of 3 minutes proposed in the revision of German DIN 19643. If a maximum ozone generator output is 165 g/h, the result is a maximum applied ozone dosage of 0.93 g/m$^3$ or 0.93 mg/L. Even if the water exiting the contact vessels contained no residual aqueous ozone, the calculated CT-value would be 3.86 mg-min/L.

Example 4

An ozone generator used with this invention is preferably a low frequency unit from BWT, a German manufacturer of such equipment. It is water-cooled, with air as feedgas. Two desiccant heat-regenerated air dryers provide for the required low dewpoint. There is no air compression; the venturi injectors generate the suction that forces the air through the dryer, the ozone generator modules and the supply tubing. The result is that ozone generation and ozone feed occur under vacuum conditions—an inherent safety measure. The output is continuously variable from 0–165 g/h.

Example 5

After emerging from one or more contact vessels, the water can be piped to two horizontal fiberglass filters, such as those available through Neptune-Benson and made from the same material as the contact vessels. The additional contact time in the freeboard of these filters—approximately one minute—should not be included in the CT calculations of the previous example without measuring the aqueous ozone concentration entering the filters. The filter medium can be standard silica filter sand, with an average size of 0.45–0.55 mm. Filter sand is an effective means for the destruction of residual ozone, lowering the rest concentration below the German threshold of 0.05 mg/L. The sand can, therefore be used as an aqueous ozone destruct medium, eliminating the need for granular activated carbon. Filter construction, with overdrain, underdrain, sand and support gravel, is standard technology; it differs from other filters only in the selection of the vessel shell material.

Example 6

Figure 3:
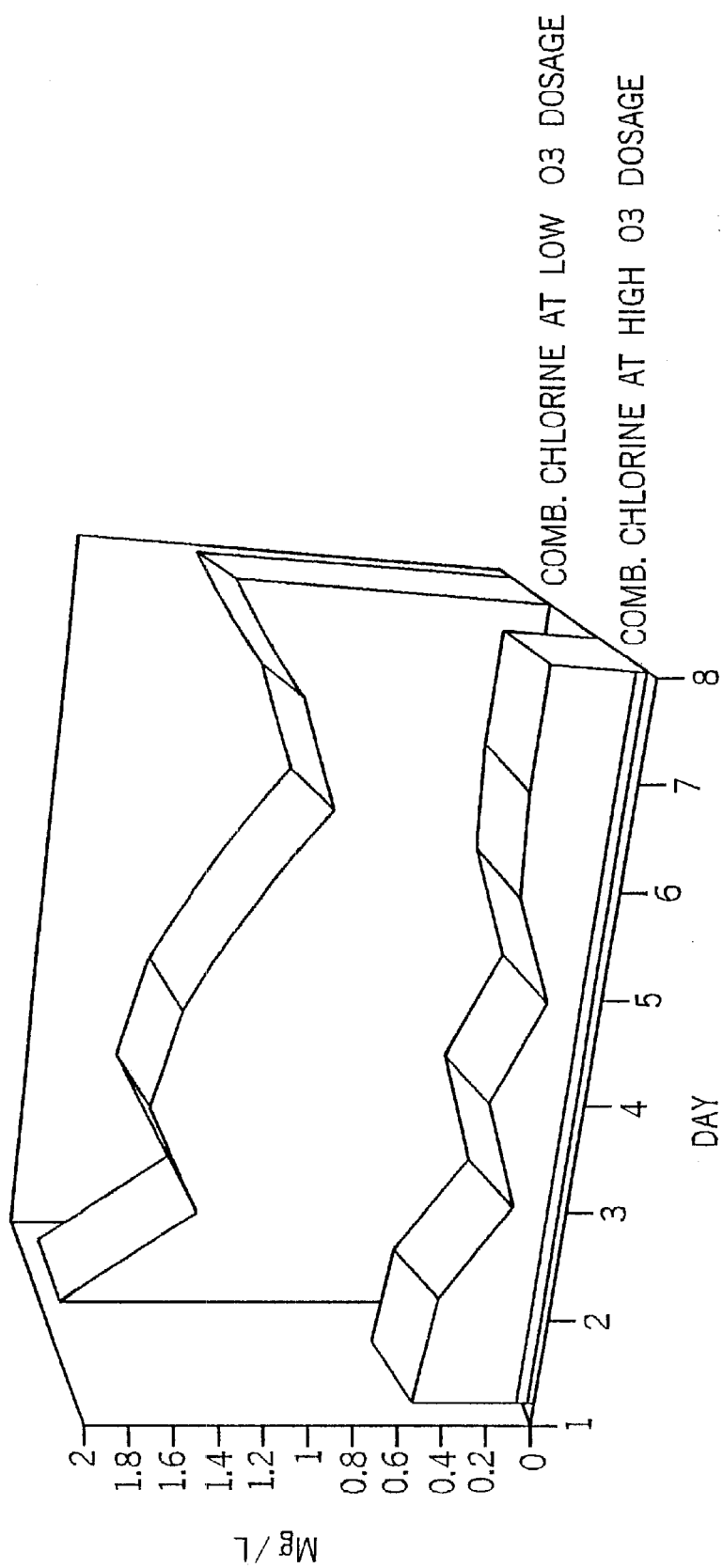
FIG. 3 graphically compares the effects of variations in ozone concentration on combined chlorine levels, consistent and in accordance with the present invention.

FIG. 3 shows combined chlorine concentrations, measured over an eight-day test period, when low and high levels of ozone were applied to the circulation/filtration flow of a system such as that described in Example 3. The low applied dose was 20 g/h O$_3$; the high dose 155 g/h—in each case with the same air feed and water circulation flows.

The results of FIG. 3 show the significance of the applied ozone concentration. While the average combined chlorine over the test period was 1.39 mg/L at 20 g/h applied ozone, it fell to an average of 0.30 mg/L when the applied ozone dosage was kept at 155 g/h. In addition, there were no detectable chloramine odors, and the overall water quality remained excellent. As illustrated in FIG. 3, ozonation can lower combined chlorine even in extremely heavily loaded indoor pools, if the applied ozone dose is high enough, and if the contact time is sufficiently long.

Example 7

With the system illustrated in FIG. 1 and characterized in FIG. 3, there has not been an outbreak of cryptosporidiosis, supporting the surprising and unexpected ability of the present treatment system to inactivate Cryptosporidium.

While the principles of this invention has been described in connection with specific embodiments, it should be understood clearly that these descriptions, along with the chosen examples and data, are made only by way of illustration and are not intended to limit the scope of this invention, in any manner. Various other ozonation systems and/or configurations can be used in conjunction with the inventive methodologies. Other advantages and features of this invention will become apparent from the following claims, with the scope thereof determined by the reasonable equivalents, as understood by those skilled in the art.

What is claimed:

1. A method of using ozone to inactivate pool water microorganisms, said method comprising:

providing a pool filtration system with a total filtration flow volume, said system including a contact vessel and a filter downstream therefrom;

diverting a partial volume of water from said filtration flow volume;

introducing ozone to said partial filtration flow volume prior to contact with said vessel, said water volume reduced to between about 1% and about 99% of said filtration volume, and said ozone introduced at a concentration up to about the saturation point of ozone in said reduced water volume;

contacting said reduced water volume for a time with said ozone concentration; and recombining said contacted, reduced water volume with said filtration flow volume.

2. The method of claim 1 wherein said partial volume is about 30% to about 50% of the said filtration flow volume.

3. The method of claim 1 wherein said contact vessel has a length and volume such that said contract time is about two minutes to about four minutes.

4. The method of claim 1 wherein said recombined water volume is further contacted with the said ozone in said filter.

5. The method of claim 1 wherein microorganisms are flocculated and removed from said recombined water volume in said filter.

* * * * *